United States Patent
Skaug

(10) Patent No.: US 8,615,539 B2
(45) Date of Patent: Dec. 24, 2013

(54) COEFFICIENT CONTROL FOR FILTER IN MAGNETIC MEDIA READ CHANNEL

(75) Inventor: Steffen Skaug, Oslo (NO)

(73) Assignee: Tandberg Storage ASA, Oslo (NO)

( * ) Notice: Subject to any disclaimer, the term of this patent is extended or adjusted under 35 U.S.C. 154(b) by 1127 days.

(21) Appl. No.: 11/774,921

(22) Filed: Jul. 9, 2007

(65) Prior Publication Data

US 2009/0019101 A1    Jan. 15, 2009

(51) Int. Cl.
*G06F 17/10*    (2006.01)
(52) U.S. Cl.
USPC .......................................... 708/322
(58) Field of Classification Search
USPC .................................. 708/300–323
See application file for complete search history.

(56) References Cited

U.S. PATENT DOCUMENTS

| | | | | | |
|---|---|---|---|---|---|
| 5,481,568 | A | * | 1/1996 | Yada | 708/313 |
| 5,654,765 | A | * | 8/1997 | Kim | 708/323 |
| 5,974,007 | A | * | 10/1999 | Getreuer | 369/30.16 |
| 6,069,857 | A | * | 5/2000 | Schell et al. | 369/44.35 |
| 6,175,588 | B1 | * | 1/2001 | Visotsky et al. | 375/148 |
| 6,437,932 | B1 | * | 8/2002 | Prater et al. | 708/323 |
| 6,563,308 | B2 | * | 5/2003 | Nagano et al. | 324/230 |
| 6,836,511 | B1 | * | 12/2004 | Marukawa | 708/323 |
| 7,171,608 | B2 | * | 1/2007 | Aida et al. | 714/794 |
| 7,194,674 | B2 | * | 3/2007 | Okumura et al. | 708/323 |
| 7,751,295 | B2 | * | 7/2010 | Katsuki | 369/59.22 |
| 7,787,202 | B2 | * | 8/2010 | Lin et al. | 708/323 |
| 2004/0044712 | A1 | * | 3/2004 | Staszewski | 708/300 |
| 2004/0218300 | A1 | * | 11/2004 | Howarth et al. | 360/39 |
| 2006/0146926 | A1 | * | 7/2006 | Bhoja et al. | 375/233 |

OTHER PUBLICATIONS

Brian D. Rigling, Subspace Leaky LMS, IEEE Signal Processing Letters, vol. 11, No. 2, Feb. 2004, pp. 136-139.*
K. K Mayyas and Tyseer Aboulnasr, Leaky LMS Algorithm: MSE Analysis for Gaussian Data, IEEE Transactions on Signal Processing, vol. 45, No. 4, Apr. 1997, pp. 927-934.*

* cited by examiner

*Primary Examiner* — Chat Do
*Assistant Examiner* — Kevin G Hughes
(74) *Attorney, Agent, or Firm* — Schiff Hardin LLP

(57) ABSTRACT

A read channel of a magnetic data storage device includes a filter to provide equalization of the signal being detected from the magnetic media. The filter utilizes coefficients for the filter response. The filter coefficients may drift sideways over time. The drift is detected and a correction is implemented by imposing a leakage on the coefficients to re-center the filter response. The leakage sign differs depending on the direction of drift detected.

9 Claims, 3 Drawing Sheets

COEFFICIENT CONTROL FOR FILTER IN MAGNETIC MEDIA READ CHANNEL

BACKGROUND OF THE INVENTION

1. Field of the Invention

The present invention relates generally to a magnetic data storage apparatus and method and in particular to a read channel for reading data from magnetic media, the read channel including equalization using a filter.

2. Description of the Related Art

Magnetic recording devices such as magnetic tape drives are used for recording computer data for storage and retrieval. Various techniques have been developed over the years to improve the characteristics of data reading and writing on the magnetic media.

On the read channel side, Finite Impulse Response (FIR) filters are widely used as a means of equalizing the read channel response to a given target response, for example PR4, EPR4, or the like. The response of these filters is controlled by a set of coefficients. Often the response of the FIR filter is changed during the operation of the tape drive in order to compensate for changes in channel characteristics, for example, changes in the recording media, the recording head, the electronics, and the like. Tape drives in particular must deal with the variations in the channel characteristics caused by the interchange of the recording media.

A general method for changing the FIR filter coefficients in order to optimize the FIR filter responses is by implementing LMS (Least Mean Square) hardware adaptability.

The LMS algorithm itself does not control the coefficients sufficiently well in an over-sampled tape drive read channel. In addition to the normal imperfections of the LMS algorithm caused by limited precision, the over-sampled channel also causes imperfections due to over sampling since there is no information from the detector about the over-sampled part of the frequency spectrum and because the detected bit position do no correspond exactly to the analog to digital sample positions.

Leaky LMS algorithms have been used to combat the issues of limited precision and coefficient drift. This is an extension of the general LMS algorithm as follows:

$$C_{x(n+1)} = (1-d)C_{xn} + uS_{xn}E_n$$

The previous coefficient is scaled down by a term (1−d) in the estimate of the new coefficient, where d is the leak down gain. This leakage limits coefficient magnitude drift, but does not control coefficient sideways drift.

SUMMARY OF THE INVENTION

The present invention provides a magnetic data storage apparatus having a data read channel, the read channel including equalization using a filter that is controlled by coefficients. The coefficients have a tendency to drift and according to the present invention drifting of the coefficients is controlled by leakage. Leakage control is achieved by applying a sideways leakage factor to the estimated impulse response gradient, where the sideways leakage factor is either positive or negative depending on the direction to apply the leakage. The objective is for the leakage to ensure that the coefficients of the filter are centered in the filter.

DETAILED DESCRIPTION OF THE PREFERRED EMBODIMENTS

Figure 1:
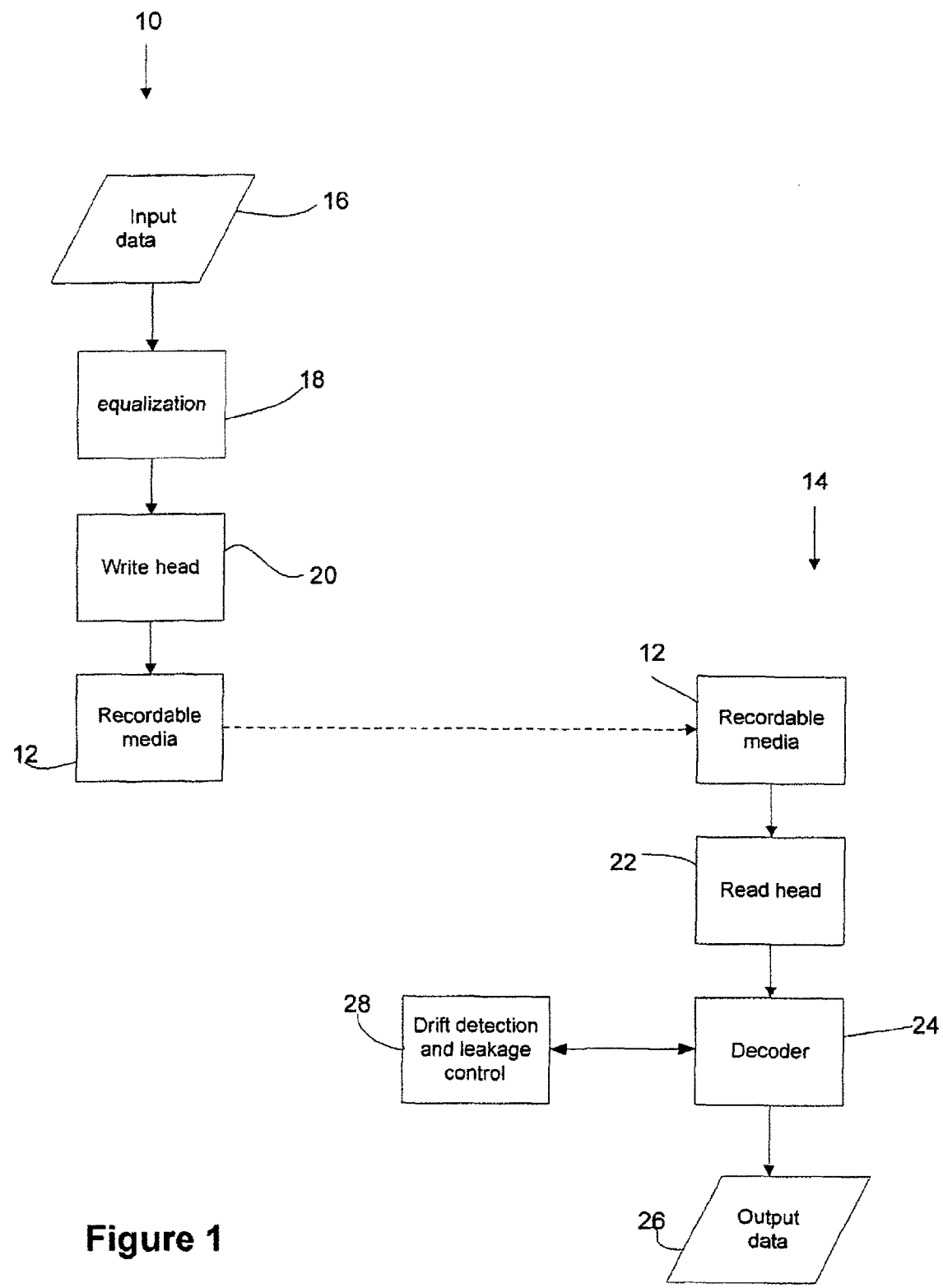
FIG. 1 is a functional block diagram of a read/write system for magnetic storage media.

FIG. 1 shows a magnetic recording system includes a write channel 10 for writing data to a recording media 12 and a read channel 14 for reading the data from the recording media 12. In one embodiment, input data 16 is provided on the write channel 10 to an equalization apparatus 18 that imposes an equalization function on the data stream prior to the data being recorded. The data with the equalization imposed thereon is provide to a write head 20 which writes the data to the recordable media 12. The recordable media 12 stores the data such as for data backup, transfer of the data to other computers or for other reasons.

The recordable media 12 may be any type of recordable media, but it preferably is a magnetic recordable tape, such as a tape in a cartridge. The data write/read apparatus for such media is a magnetic tape cartridge drive, which as well understood by those of skill in this art includes the necessary tape moving apparatus and guides, a read/write head and cartridge loading and ejecting mechanisms. The data write/read apparatus, commonly referred to as a tape drive, may be a component in a data backup system such as for a computer network, and can be a part of a so-called autoloader apparatus. Other magnetic recordable media and recording/reading systems may be provided instead and are encompassed within this invention.

The recordable media 12 may be read immediately by a read head 22, such as for purposes of confirming that the data has been correctly written, or it may be read after some period of time has passed. For example, the data could be used for data recovery from a backup set of some time ago. It is also possible that the recordable media 12 was recorded by another read/write apparatus and is being read by the present apparatus as part of a program installation or data transfer, for example. The read head 22, which can be in the same physical unit with the write head or may be separate, provides the signal detected from the recording media to an decoding apparatus 24. The decoder 24 decodes the signal and obtains the data 26 therefrom. The decoder 24 of one embodiment includes an analog-to-digital converter, a filter, and a detector as part of the detection path. The filter of the preferred embodiment operates according to filter coefficients and these coefficients can change over the course of operation of the device.

The decoder 24, and in particular the filter portion, is connected to a controller 28 that determines if the coefficients of the filter have drifted. If drifting of the coefficients is found, the controller 28 imposes a leakage on the filter to address the drift.

Figure 2:
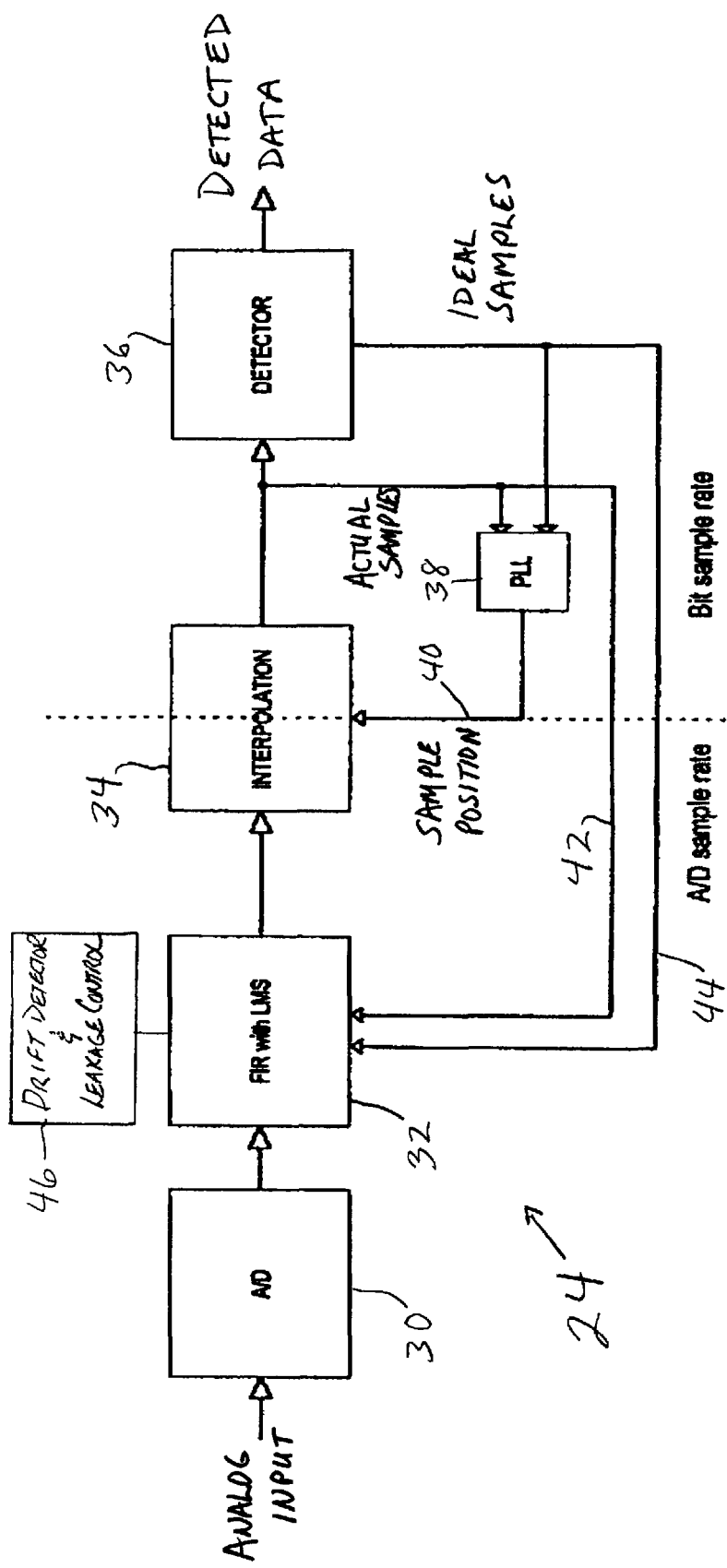
FIG. 2 is a functional block diagram of a read channel.

In further detail and with reference to FIG. 2, the decoder apparatus 24 of a preferred embodiment includes an analog-to-digital converter 30 which receives the analog signal from the read head, a finite impulse response (FIR) filter 32 that includes a least means square (LMS) coefficient adaptation algorithm, a interpolator 34 which produces at its output actual samples, and a detector 36 that outputs the detected data. A phase locked loop (PLL) 38 is provided in a feedback loop 40 from the output of the interpolator 34 and from the detector 36 to provide sample position information to the interpolator 34. A feedback loop 42 is also provided from the output of the interpolator 34 and a feedback loop 44 from the detector 36 to the filter 32. This is a typical arrangement of components in the read channel and may be varied depending on the needs of the user, for example.

In particular, the filter 32 of a preferred embodiment is an FIR filter that has its tap coefficients controlled by the LMS algorithm. The coefficients are the tap weights of the FIR filter. These control the filter response. The FIR is used to equalize the read channel response to a specific partial response target (for example, PR4, EPR4, and the like). In one implementation, the filter uses twelve coefficients, although more or less could be used. The number of coefficients used is a tradeoff between performance and cost. There are a large variation in the gradient based LMS algorithms, all of which are encompassed within the present invention. Other filter types are possible.

The read channel system uses an analog-to-digital converter 30 sample rate that is higher than the bit rate of the system. This is more complicated than it is to sample the analog-to-digital converter 30 at the bit sample rate, but is necessary in the tape drive because the speed variations in the tape drive are too fast to let the analog-to-digital converter 30 sample position be controlled by the phase locked loop 38. This would make the FIR filter 32 a part of the phase locked loop 38 and thereby cause delay in the feedback loop to be too long to achieve a quick response. So in a tape drive, the FIR filter 32 has to be outside the phase locked loop feedback loop 40 and has to operate at a higher sample rate than the bit rate. Interpolation 34 is used to bring the analog-to-digital converter 30 and the FIR filter 32 rate down to the bit rate that is suitable for the detector 36. The detector 36 of one embodiment is a Viterbi detector.

In the FIR filter block 32, the LMS function uses information from the detector 36 about the ideal sample values. The coefficients are updated according to the following formula:

$$Cx(n+1) = Cxn + uSnxEn,$$

where $Cx(n+1)$ is the new value of the FIR filter coefficient x at a sample n+1, Cxn is the previous value of the FIR filter coefficient x at sample n, u is the LMS gain, Sxn is the FIR filter input sample value at tap x at the sample n and En is the difference between the actual FIR filter output and the ideal FIR filter output at sample n.

The LMS algorithm is adapted to the tape drive environment, where the FIR filter 32 and the detector 36 operate at different rates. Due to over-sampling, bit samples are not available as often as are the analog-to-digital samples. Therefore, the En term of the LMS formula is only available for a fraction of the FIR filter input samples. Also, the En term is not available at exactly the same point in time as the FIR filter input samples due to the interpolation. This handling is not updating the FIR filter coefficients if there is not a new En available, and depending upon the sample position allocating the En to the nearest FIR filter input samples.

The LMS coefficient algorithm needs a starting point for the coefficients. If this starting point is not good enough for detecting data, the LMS algorithm will not receive valid information on the ideal sample values, and will not operate. Over the operation of the filter, the coefficients change to accommodate changes in the system. Such changes in a tape drive system can include variations in temperature, drift in the electronics, head-to-tape interface variations, and the like.

The present invention is an apparatus and method for implementing coefficient leakage that controls the delay in the Finite Impulse Response (FIR) filter 32 so that the coefficients of the FIR filter that have drifted are centered within the FIR filter. In particular, a drift detector and leakage control 46 is provided connected to the filter 32. The drift detector determines whether the coefficients have drifted from the desired response and the leakage control imparts a leakage on the coefficients to cause the coefficients to cause the response of the filter to return to the desired response. In other words, causes the coefficients to be re-centered. The drift detector and leakage control 46 may be a separate component or several components or may be incorporated into a component in the system. The drift detector and leakage control may be separate from one another. One or both functions may be implemented by software or hardware or a mix.

Figure 3:
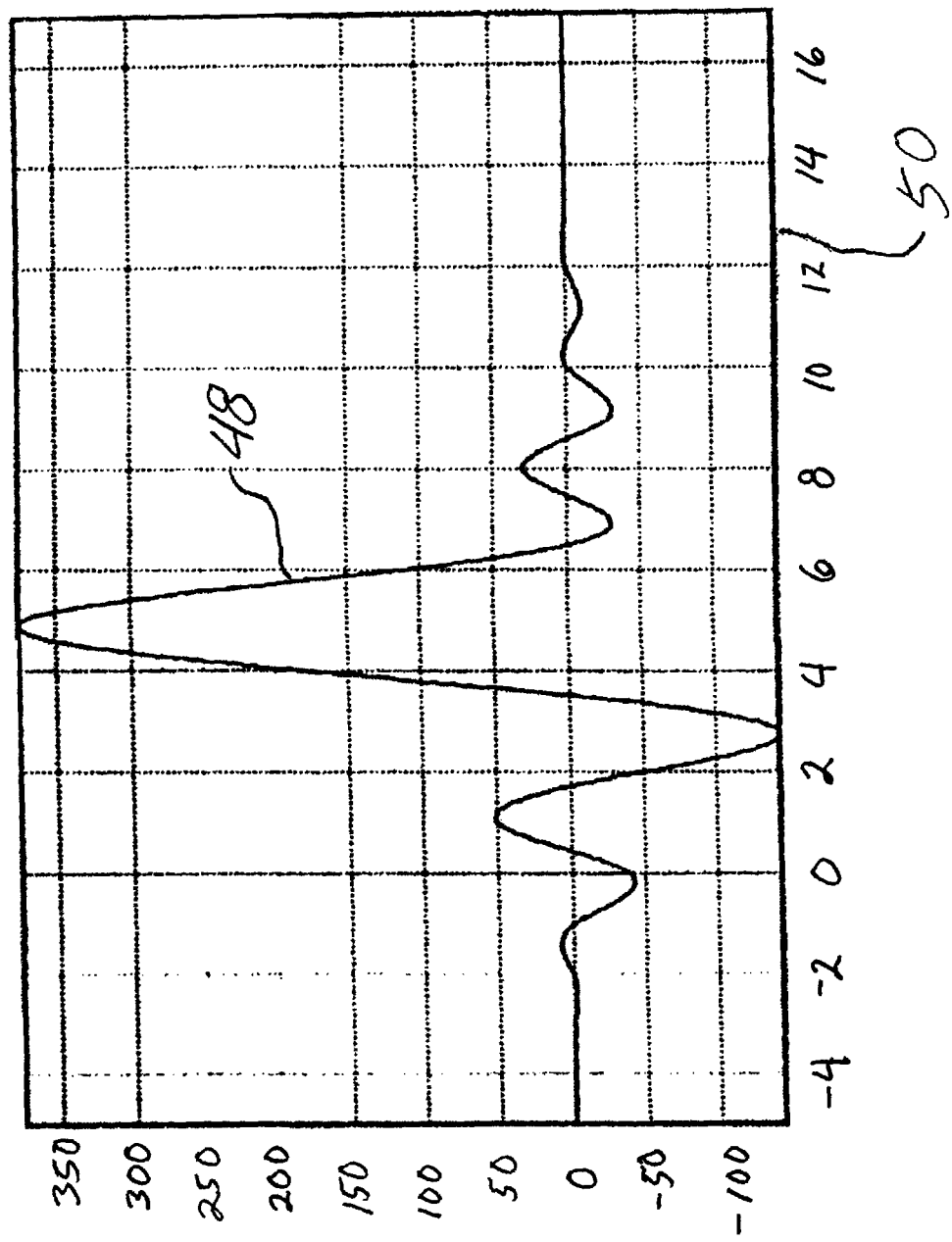
FIG. 3 is a graph of an impulse response of a filter.

An impulse response of the FIR filter 32 is shown in FIG. 3. In the illustrated example, there are 12 FIR filter coefficients, from 0 to 11. In the plot 48 shown on the graph 50 of FIG. 3, the coefficients are interpolated to generate the illustrated response curve 48. The plot 48 is also derived before and after the 12 coefficients.

In order to avoid sideways drift of the coefficients in the FIR filter 32, a sideways leakage is applied to the FIR filter coefficients. The position of the response within the FIR filter 32 is estimated. This can be accomplished, for example, by estimating the DC delay of the FIR filter 32. If the delay is too high, the coefficients are drifted towards the beginning of the FIR filter, which is to the left in the graph of FIG. 3. If the delay is too low, the coefficients are drifted to the right. In other words, the filter has a response window and the coefficients may drift so as to lie outside the window.

The drift component is calculated by estimating the slope, or gradient, of the impulse response for each of the filter coefficients. The drift detector 46 shown schematically in FIG. 2 performs the calculations. The drift determination may include a threshold that institutes a correction only when the drift has exceeded the threshold. It is foreseeable that the drift detection could provide a modified detection with varying degrees of correction. In a preferred embodiment, the drift calculation is according to the formula:

$$G_x = C_{x+1}[C_x] - C_{x-1}$$

The sideways leakage is applied to the Least Mean Square (LMS) formula as follows:

$$C_{x(n+1)} = (1-d)C_{xn} + sG_x + uS_{xn}E_n$$

The $G_x$ term is the estimated impulse response gradient and the s term is the sideways leakage gain. The +− sign is determined for every sample to be positive or negative, depending upon whether the leakage shall be applied to the left or to the right. The leakage control 46 provides the sideways leakage to the filter.

According to the foregoing, the filter coefficients are moved sideways back towards a center position in the filter when it has been determined that the coefficients are drifting. The leakage may be of a magnitude to move the filter response to the center, or only move the response toward the center.

The present invention also provides a method, which is apparent from the foregoing, wherein leakage is applied to coefficients of the filter to re-center the response when drift is detected.

Although other modifications and changes may be suggested by those skilled in the art, it is the intention of the inventors to embody within the patent warranted hereon all changes and modifications as reasonably and properly come within the scope of their contribution to the art.

I claim:

1. An apparatus for controlling a plurality of coefficients of a filter in a read channel of a magnetic media read apparatus that reads data from magnetic media, comprising:
    the filter having an input for receiving the data detected from the magnetic media, said filter having an output for outputting filtered data for equalization of the data in the read channel, said filter using said plurality of coefficients for generating the filtered data;

a unit including a detector connected to receive an output of said filter, said unit being connected in a feedback loop, said filter being outside said feedback loop;

a control connected to said filter to detect drift in said coefficients, said control being operable to determine said drift by estimating a gradient of an impulse response of each of said filter coefficients, said control imposing a leakage based on said detected drift on said filter coefficients to cause a response of the filter to return to a desired response;

said filter having an LMS function using information from the detector about ideal sample values, the filter coefficients being updated according to the formula:

$$C_{x(n+1)} = (1-d)C_{xn} + sG_x + \mu S_{xn} E_n$$

where d is the leak down gain, $C_{x(n+1)}$ is a new value of a filter coefficient x at a sample n+1, $C_{xn}$ is a previous value of the filter coefficient x at sample n, $\mu$ is an LMS gain, $S_{xn}$ is a filter input sample value at filter coefficient x at the sample n, $E_n$ is a difference between an actual filter output and an ideal filter output at sample n, $G_x$ is an estimated impulse response gradient, and s is sideways leakage gain; and said drift being calculated according to the formula $$G_x = C_{(x+1)} - C_{(x-1)}.$$

2. An apparatus as claimed in claim 1, wherein said control implements a coefficient leakage of either a positive or negative magnitude depending on a direction of drift detected.

3. An apparatus as claimed in claim 1, wherein said filter is a finite impulse response filter.

4. An apparatus as claimed in claim 1, wherein said unit connected to receive said output of said filter comprises an interpolation unit, said interpolation unit being connected in said feedback loop.

5. A read channel of a magnetic media read device, comprising:

a read head mounted and operable to read magnetic data from said magnetic media, said read head having an output for detected data;

an analog-to-digital converter having an input connected to said output of said read head, said analog-to-digital converter having an output, said analog-to-digital converter being operable to convert analog magnetic signals to digital data;

a filter connected at an output of said analog-to-digital converter, said filter having a response determined by coefficients, said filter having an output for data connected to a detector; and a coefficient control connected to said filter, said coefficient control detecting drift in said coefficients, said coefficient control being operable to determine said drift by estimating a gradient of an impulse response of each of said filter coefficients, said coefficient control imposing a leakage based on said detected drift on said filter coefficients to cause said response of the filter to return to a desired response;

said filter having an LMS function using information from the detector about ideal sample values, the filter coefficients being updated according to the formula:

$$C_{x(n+1)} = (1-d)C_{xn} + sG_x + \mu S_{xn} E_n$$

where d is the leak down gain, $C_{x(n+1)}$ is a new value of a filter coefficient x at a sample n+1, $C_{xn}$ is a previous value of the filter coefficient x at sample n, $\mu$ is an LMS gain, $S_{xn}$ is a filter input sample value at filter coefficient x at the sample n, $E_n$ is a difference between an actual filter output and an ideal filter output at sample n, $G_x$ is an estimated impulse response gradient, and s is sideways leakage gain; and said drift being calculated according to the formula $$G_x = C_{(x+1)} - C_{(x-1)}.$$

6. A read channel as claimed in claim 5, wherein said filter is a finite impulse response filter and said coefficients are coefficients of a least mean square calculation.

7. A read channel as claimed in claim 5, wherein said coefficient control applies a leakage of either a first or second sign, depending on a direction of the drift detected.

8. A method for controlling coefficients in a filter in a read channel of a magnetic media read apparatus, comprising the steps of:

filtering data in a read channel of the magnetic media read apparatus, a filter response of the filter being characterized by said coefficients;

detecting a drift in said coefficients and determining said drift by estimating a gradient of an impulse response of each of said filter coefficients, and imposing a leakage based on said detected drift on said filter coefficients to cause said response of the filter to return to a desired response;

said filter having an LMS function using information from the detector about ideal sample values, the filter coefficients being updated according to the formula:

$$C_{x(n+1)} = (1-d)C_{xn} + sG_x + \mu S_{xn} E_n$$

where d is the leak down gain, $C_{x(n+1)}$ is a new value of a filter coefficient x at a sample n+1, $C_{xn}$ is a previous value of the filter coefficient x at sample n, $\mu$ is an LMS gain, $S_{xn}$ is a filter input sample value at filter coefficient x at the sample n, $E_n$ is a difference between an actual filter output and an ideal filter output at sample n, $G_x$ is an estimated impulse response gradient, and s is sideways leakage gain; and said drift being calculated according to the formula $$G_x = C_{(x+1)} - C_{(x-1)}.$$

9. A method as claimed in claim 8, wherein said detecting of the drift detects a direction of the drift and wherein said imposed leakage imposes the leakage in a direction to counter a direction of the detected drift.

* * * * *